No. 784,997. PATENTED MAR. 14, 1905.
P. FAUTH.
DAMPER.
APPLICATION FILED JUNE 9, 1904.
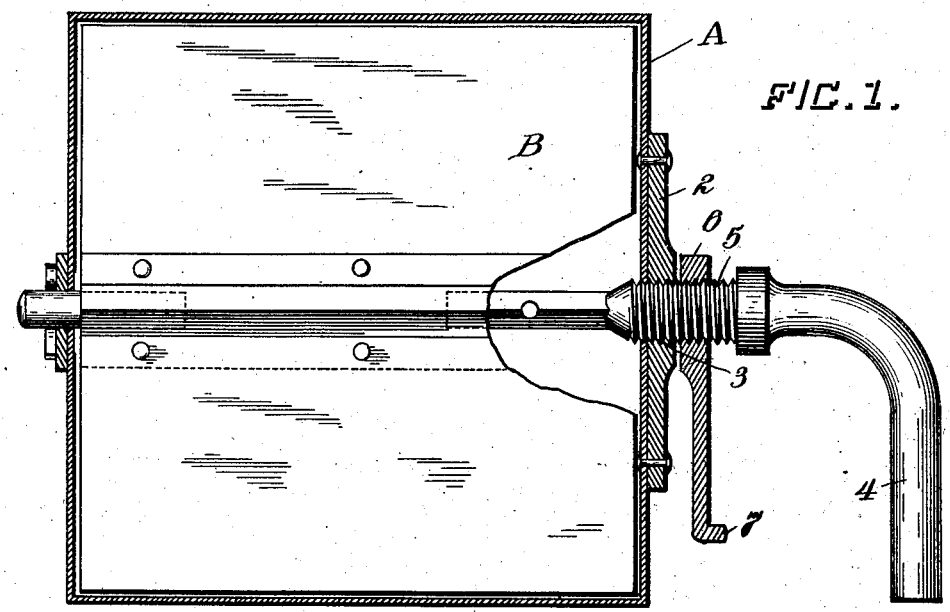
FIG. 1.
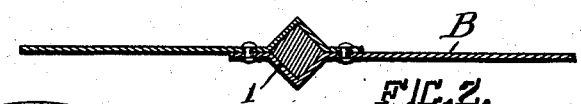
FIG. 2.
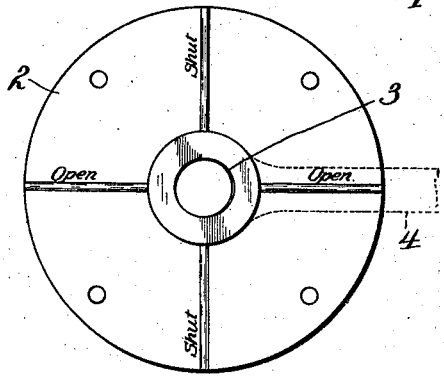
FIG. 3.
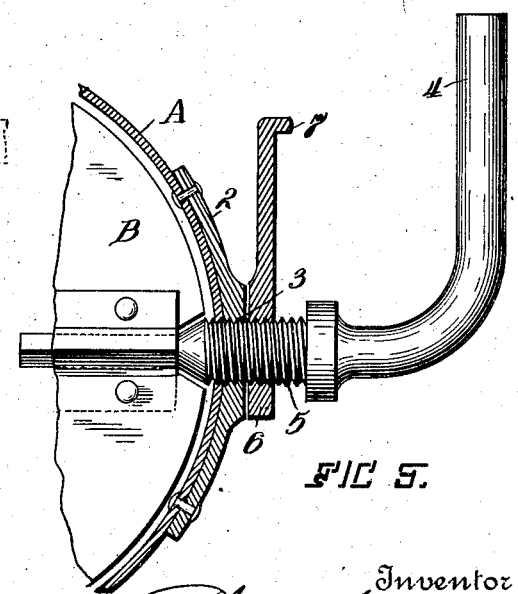
FIG. 5.
FIG. 4.
Witnesses
Milton Lenoir.
Watts T. Estabrook.
Inventor
Philip Fauth
by Vernon E. Hodge
his Attorney.

No. 784,997.

Patented March 14, 1905.

UNITED STATES PATENT OFFICE.

PHILIP FAUTH, OF WASHINGTON, DISTRICT OF COLUMBIA.

DAMPER.

SPECIFICATION forming part of Letters Patent No. 784,997, dated March 14, 1905.

Application filed June 9, 1904. Serial No. 211,868.

*To all whom it may concern:*

Be it known that I, PHILIP FAUTH, a citizen of the United States, and a resident of the city of Washington, in the District of Columbia, have invented a new and useful Improvement in Dampers, of which the following is a specification.

My invention relates to an improvement in dampers for hot-air, ventilating, and smoke ducts; and an object of the invention is to provide means for locking the damper at various positions.

With this object in view my invention consists in a damper-lever having a screw-thread, a damper connected with the lever and fitted in the duct in connection with a locking-nut mounted on the threaded portion of the lever and adapted to be turned thereon against the outer surface of the duct, or a disk or plate thereon, whereby to lock the damper securely in place.

My invention further consists in certain novel features of construction and combinations of parts, which will be hereinafter described, and pointed out in the claims.

In the accompanying drawings, Figure 1 is a sectional view through the air-duct, showing the damper and damper-lever in plan with parts in section. Fig. 2 is a sectional view through the damper. Fig. 3 is a view of the face plate or disk. Fig. 4 is a detached view of the locking-nut and lever; and Fig. 5 is a slightly-modified form, showing the application of the invention to a round duct.

A represents a duct for hot air, smoke, or ventilating purposes—such, for instance, as is commonly used for supplying fresh air to furnaces.

B is the damper, conforming in shape to the general outline of the duct, whether it be of rectangular form, as shown in Fig. 1, or round, as shown in Fig. 5, and substantially fitting the inner walls thereof.

The damper may be made in various ways of sheet metal—for instance, as shown in Fig. 2, in two parts riveted together and forming together the angular socket 1 through the center. Other methods of construction might be equally advantageous, although this is a feasible form.

On the outer surface of the duct a plate or disk 2 is securely riveted, and this has a central opening 3 in line with a corresponding opening through the front and rear of the duct, and this serves as a bearing for the damper-axis. The hole 3 of the disk or plate is screw-threaded. The numeral 4 indicates a damper-lever. This is preferably L-shaped, comprising a shank at one end and a handle at the other with an intermediate screw-threaded portion 5. The shank is angular and adapted to enter and fit the angular socket 1 of the damper at one end thereof, and the screw-threads 5 turn in the threads of the hole or opening 3. This shank may extend entirely through the duct, but preferably is made in two sections, a short section at the opposite end being sufficient to support the damper at that point. When thus constructed, if the screw is turned far enough it will force the damper against the opposite side of the pipe and hold it there by frictional contact; but as a means for positively locking the damper in its various positions—that is, open or closed or in any intermediate position—a locking-nut 6 is mounted on the threads of the damper-lever. This nut is preferably provided with a handle 7, forming an integral part thereof whereby to manipulate it, thus making it unnecessary to apply a wrench or other tool to the accomplishment of the purpose. With this construction when it is necessary to turn the damper the nut is first unscrewed away from the disk or plate 2, the handle is grasped, and the damper turned to the position desired, whereupon the locking-nut is screwed up tight against the plate, and the damper is in that way securely locked in place against the possibility of turning. With a damper of this sort no sliding laterally across the duct is required, as heretofore, and consequently when the duct is closed air cannot pass, whereas in constructions heretofore in which sufficient play was necessary between the damper and duct to allow for locking and unlocking the damper more or less air could always pass even when the damper was closed. In my present invention the damper can be adjusted to a nicety to regulate the influx of air, and this adjustment is practically without limitation, it not being confined to two or three different positions.

It is evident that slight changes might be resorted to in the form and arrangement of the parts described without departing from the spirit and scope of my invention, and hence I do not wish to limit myself to the exact construction herein set forth; but, Having fully described my invention, what I claim as new, and desire to secure by Letters Patent, is—

1. The combination with a pipe or duct, a plate on one surface thereof having a threaded orifice, and a damper fitted to the pipe or duct and provided with socket in one end, of a stem having a thread which screws into the threaded orifice in the plate whereby to feed the stem into the socket when turned and whereby the damper may be forced against the opposite side of the pipe.

2. The combination with a pipe or duct, a plate on one surface thereof having a threaded orifice, and a damper fitted to the pipe or duct and provided with a socket in one end, of a stem having a thread which screws into the threaded orifice in the plate whereby to feed the stem into the socket when turned and whereby the damper may be forced against the opposite side of the pipe, and means for positively locking the damper wherever set against turning.

3. The combination with a pipe or duct, a plate on one surface thereof having a threaded orifice, and a damper fitted to the pipe or duct and provided with a socket in one end, of a stem having a thread which screws into the threaded orifice in the plate whereby to feed the stem into the socket when turned and to hold the stem against endwise movement when not turned and a nut on the threaded portion of the stem which screws up to the plate on the side of the flue or duct and acts in opposition thereto to lock the damper wherever set against turning.

4. The combination with a pipe or duct, a plate on one surface thereof having a threaded orifice, and a damper fitted to the pipe or duct and provided with an angular socket in one end, of a stem having an angular end which enters the angular socket and a thread which screws into the threaded orifice in the plate whereby to feed the stem into the socket when turned and to hold the stem against endwise movement when not turned and a nut on the threaded portion of the stem which screws up to the plate on the side of the flue or duct and acts in opposition thereto to lock the damper wherever set against turning.

5. The combination with a pipe or duct, and a damper fitted therein, of a stem secured to the damper, said stem having a threaded portion, a plate secured to the pipe or duct and having a threaded orifice for the threaded portion of the stem and a nut on the threaded portion of the stem which screws up to the plate and in conjunction therewith locks the damper against turning, and a handle on the stem by which it is held when the nut is turned to lock the damper.

In testimony whereof I have signed this specification in the presence of two subscribing witnesses.

PHILIP FAUTH.

Witnesses:
HERBERT C. EMERY,
VERNON E. HODGES.